United States Patent [19]
Ihm et al.

[11] Patent Number: 4,839,329
[45] Date of Patent: Jun. 13, 1989

[54] PROCESS FOR MANUFACTURING A TITANIA SUPPORTED PALLADIUM CATALYST

[75] Inventors: Sun K. Ihm; Dong K. Lee, both of Seoul, Rep. of Korea

[73] Assignee: Korea Advanced Institute of Science and Technology, Seoul, Rep. of Korea

[21] Appl. No.: 111,663

[22] Filed: Oct. 23, 1987

[30] Foreign Application Priority Data

Mar. 11, 1987 [KR] Rep. of Korea .................. 2169/1987

[51] Int. Cl.[4] ............................................. B01J 23/44
[52] U.S. Cl. .................................................... 502/339
[58] Field of Search ........................................ 502/339

[56] References Cited

U.S. PATENT DOCUMENTS

| | | | |
|---|---|---|---|
| 2,030,283 | 4/1931 | DeRewal | 502/339 X |
| 3,271,327 | 9/1966 | McEvoy et al. | 502/339 X |
| 4,374,047 | 2/1983 | Bozon et al. | 502/339 X |

FOREIGN PATENT DOCUMENTS

| | | | |
|---|---|---|---|
| 59-112835 | 6/1984 | Japan | 502/339 |
| 922022 | 3/1963 | United Kingdom | 502/339 |

Primary Examiner—Patrick P. Garvin
Assistant Examiner—George R. Fourson
Attorney, Agent, or Firm—Birch, Stewart, Kolasch & Birch

[57] ABSTRACT

A process for manufacturing palladium catalyst on titania for converting acetylene to ethylene selectively, wherein the catalyst is composed of palladium in amount of 0.01–0.2% by weight and a titania carrier of 99.9–99.8% by weight.

3 Claims, 7 Drawing Sheets

PROCESS FOR MANUFACTURING A TITANIA SUPPORTED PALLADIUM CATALYST

FIELD OF THE INVENTION

The present invention relates to a novel and advanced process for manufacturing a catalyst of high selectivity which is capable for converting the acetylene contained in the ethylene in very small quantity and deteriorating the quality of products by acting as a poison to the catalyst used in a polymerization process of ethylene into the ethylene through a selective hydrogenation.

BACKGROUND OF THE INVENTION

Researches on removal of the acetylene acting as a fatal toxic substance in a high molecular reaction of the ethylene have made a continuous progress up to now since 1950 year when the ethylene of high purity was required, and a typical process thereof has been a hydrogenation process using a catalyst.

It is disclosed in U.S. Pat. Nos. 2,511,453 and No. 2,735,897 that in early stage, chrome, cobalt, nickel, etc. and largely used with an intent to utilize cheap catalyst for the purpose of removing by a catalytic reaction the small quantity of acetylene contained in excessive ethylene. As a demand for ethylene of high purity was increased, however, it became necessary to develop a catalyst of higher selectivity. The critical line of small acetylene content in the ethylene has decreased continuously, that is, it was lower than 50-100 ppm in 1950s, but it became lower than 10-20 ppm in 1960s, and it is recently required to be lower than 5 ppm as a part of quality improvement of industrial products using the ethylene. Since the hydrogenation is effected in the presence of excessive ethylene, very high selectivity is required for it. In other word, it becomes in need of a catalyst to minimize loss of the excessively present ethylene caused by conversion of the ethylene into the ethane in the hydrogenation, and at the same time to hydrogenize selectively only the acetylene and convert it into the ethylene.

To this end, a palladium catalyst, a precious metal known as the most excellent one of transition metals in the aspects of activity and selectivity, even though it is high in price, was developed at the end of the 1950's (U.S. Pat. No. 2,927,141) and has been used practically in the industry since the middle of 1060s. The catalyst used now most widely is Pd/α—Al$_2$O$_3$ which contains the palladium of 0.025-0.3 wt.% and the typical commercial catalysts are ICI-38-1 catalyst developed by the Imperial Chemical Industry Company, and Girdler G-583 developed by the Union Carbide Company.

SUMMARY OF THE INVENTION

The present invention is characterized in manufacturing a hydrogenation catalyst for removal of high selective acetylene by supporting palladium metal in an amount of 0.1%-0.2% by weight Titania carrier in an amount of 99.9%-99.8% by weight selectively. The Titania carrier can be reduced itself with hydrogen and interact intensively with a metal under certain conditions in contact with the conventional α—Al$_2$O$_3$ carrier.

BRIEF DESCRIPTION OF THE DRAWINGS

FIG. 1-1 is a graphic diagram showing the activity and selectivity depending on a change in the reaction temperature on Alumina supported palladium catalyst, FIG. 2-1 is a graphic diagram showing the activity and selectivity depending on a change in the acetylene concentration on Alumina supported palladium catalyst, FIG. 3-1 is a graphic diagram showing the activity and selectivity depending on a change in the composition ratio of the hydrogen and acetylene on Alumina supported palladium catalyst.

DETAILED DESCRIPTION OF THE INVENTION

Figure 1:
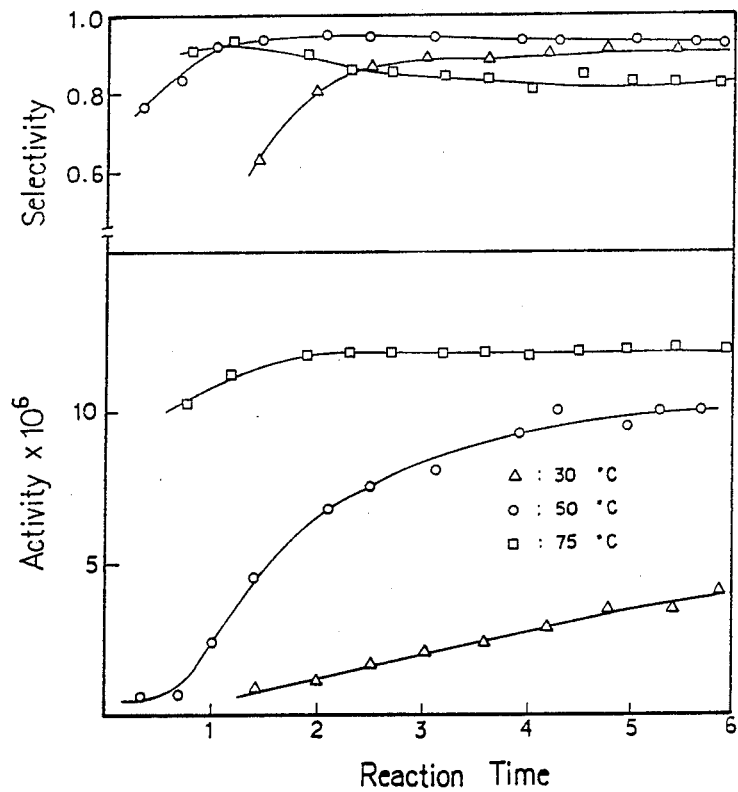
FIG. 1 is a graphic diagram showing the activity and selectivity depending on a change in the reaction temperature on Titania supported palladium catalyst.
Figure 1:
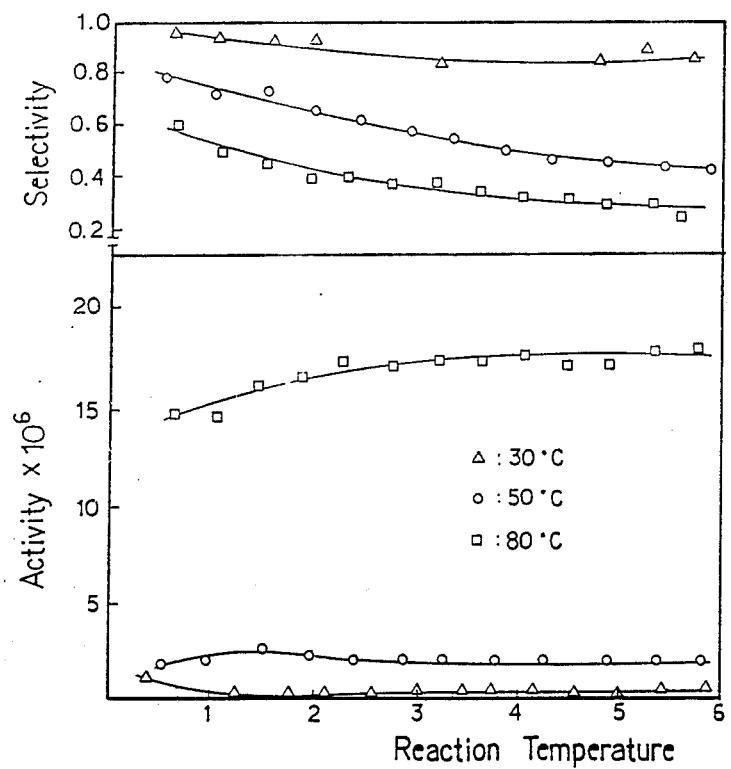

The process for manufacturing the catalyst according to the invention is as follows:

(1) 10 g of Titania treated under vacuum at 450° C. for 12 hours and thereby removed moisture is poured into a round flask of rotary vacuum evaporator.

(2) 1.67-33.47 mg of the palladium chloride (PdCl$_2$) is melted in 100 ml of 1N hydrochloric acid solution and then mixed with 0.8 g of the sodium acetate.

(3) The above-mentioned solution is diluted with the distilled water so as to be 1200 cc of an aqueous solution.

(4) The solution is poured slowly into the round flask containing Titania.

(5) The flask is rotated for 48 hours maintaining the pressure of 10 torr and the temperature of 80° C. in the flask.

(6) The catalyst manufactured by the above-mentioned method is calcined in an air circulating heating furnace at 500° C. for 3 hours and then cooled to the normal temperature.

The following Examples 1 and 2 relate to changes in the activity and selectivity of the catalyst according to the invention following changes in the content of palladium and reduction temperature of hydrogen. The activity is defined as the number of mole of the converted acetylene per time (second) and per gram (g) of unit catalyst, and the selectivity represents the mole fraction of the ethylene between ethane and ethylene contained in a reaction product.

EXAMPLE 1

In the manufacturing process of catalyst as described above in detail, the quantity of the palladium chloride (PdCl$_2$) was changed, and the activity and selectivity depending on the change was observed. The reaction was carried out with a reactive substance of composition as shown in Table 1 at the temperature of 50° C. for 8 hours.

The results are as shown below, and the activity and selectivity is taken as the average value during the reaction time.

TABLE 1

Selectivity depending on the quantity of the palladium chloride

| Quantity (mg) of Palladium Chloride | Average Activity $\times 10^6$ | Average Selectivity |
|---|---|---|
| 1.67 | 1.2 | 0.87 |
| 5.01 | 3.5 | 0.88 |
| 8.40 | 6.0 | 0.91 |
| 13.36 | 8.4 | 0.82 |
| 16.72 | 10.1 | 0.81 |
| 33.47 | 16.4 | 0.75 |

At the quantity of the palladium chloride is increased, the average activity is increased, but with respect to the selectivity, it can be found that when the quantity of palladium chloride is 8.40 mg (the percent in weight of the palladium only is 0.05), the average selectivity is the highest.

EXAMPLE 2

When the catalyst is reduced to the hydrogen, the activity and selectivity shows a difference depending on the reduction temperature. For a catalyst containing 8.40 mg of the palladium chloride, the average activity and selectivity depending on change of the reduction temperature are as shown in Table 2. The reactive substance of the same composition as in Example 1 was used, and the reaction temperature was 50° C.

TABLE 2

Selectivity depending on the reduction temperature

| Reduction Temperature(°C.) | Average Activity $\times 10^6$ | Average Selectivity |
|---|---|---|
| 100 | 4.0 | 0.68 |
| 150 | 6.0 | 0.75 |
| 200 | 10.8 | 0.84 |
| 250 | 6.0 | 0.91 |
| 300 | 0.8 | 0.65 |
| 350 | 2.5 | 0.82 |
| 400 | 2.5 | 0.82 |
| 500 | 3.1 | 0.74 |

It can be seen from the above table that the selectivity is the highest when the reduction temperature is 250° C.

The following Examples are to describe the invention in more detail. The alumina supported palladium catalyst used widely for the industrial purposes was made in the same process as described above, and the activity, selectivity and the rate at which a high molecular compound causing the inactivation of catalyst is accumulated on the catalyst, were compared with the titania supported palladium catalyst according to the invention.

The scope of comparison includes factors having effects on the selectivity in the practical process: reaction temperature, concentration of the acetylene in reactive substance, composition of the hydrogen and acetylene and effects of addition of the carbon monoxide.

EXAMPLE 3

0.1 g of the titania supported palladium catalyst according to the invention, which was manufactured by the process as described above, and which contains 8.40 mg of the palladium chloride, are poured into a U-shaped reactor of 1.2 cm in diameter and 20 cm in length, which was made of quartz; the hydrogen is made to flow in a rate of 20 ml/min.; the temperature of catalyst is raised up to 250° C. by 5° C. a minute; after the temperature is maintained at 250° C. for 30 minutes, the flow of hydrogen is cut off; the helium in lieu of the hydrogen is made to flow at a rate of 20 ml/min., and cooled to the reaction temperature. Subsequently the reactive substance of the following composition is made to flow to the catalyst layer at the rate of 3 ml per minute.

| Components | Mole % |
|---|---|
| Acetylene | 1 |
| Hydrogen | 2 |
| Ethylene | 97 |

As the result of an experiment conducted at the reaction temperature of 30°–80° C. in the range of reaction temperature in the actual process, the activity and selectivity were turned out as shown in FIG. 1. The activity is defined as the number of moles of the acetylene contained in the converted reactive substance in a unit time (second) and in 1 g of the unit catalyst, and the selectivity represents the mole fraction of the ethylene between the ethane and ethylene in the reaction product.

COMPARATIVE EXAMPLE 3

Results of an experiment similar to that as described in Example 3, which was conducted with the alumina supported palladium catalyst, are as shown in FIG. 1. Compared FIG. 1 with FIG. 1-1, the titania supported catalyst of the invention has a very high selectivity, and shows a stability which does not fall in selectivity even at the expiration of the reaction time.

EXAMPLE 4

Figure 2:
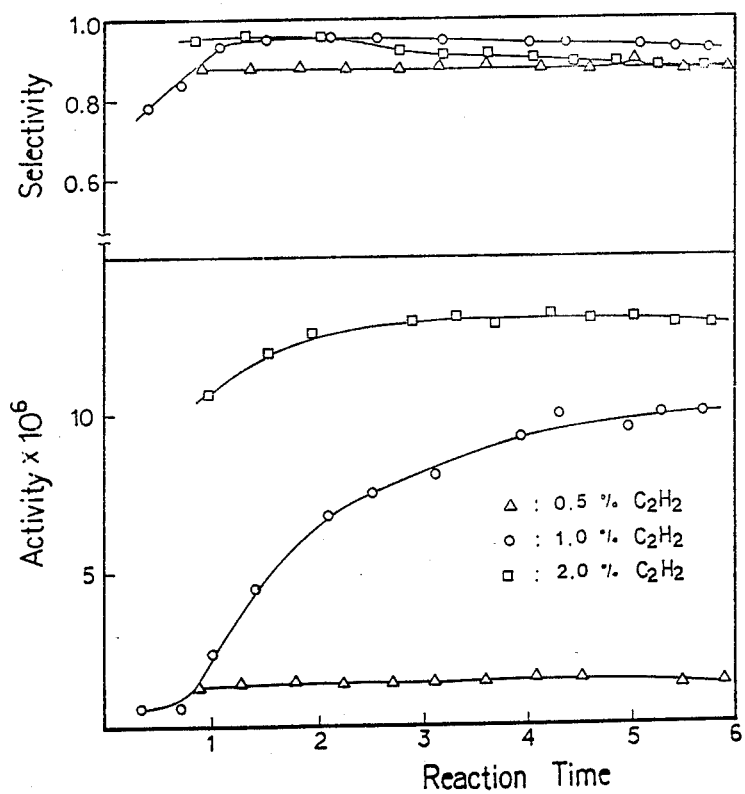
FIG. 2 is a graphic diagram showing the activity and selectivity depending on a change in the acetylene concentration on Titania supported palladium catalyst.
Figures 1, 2:
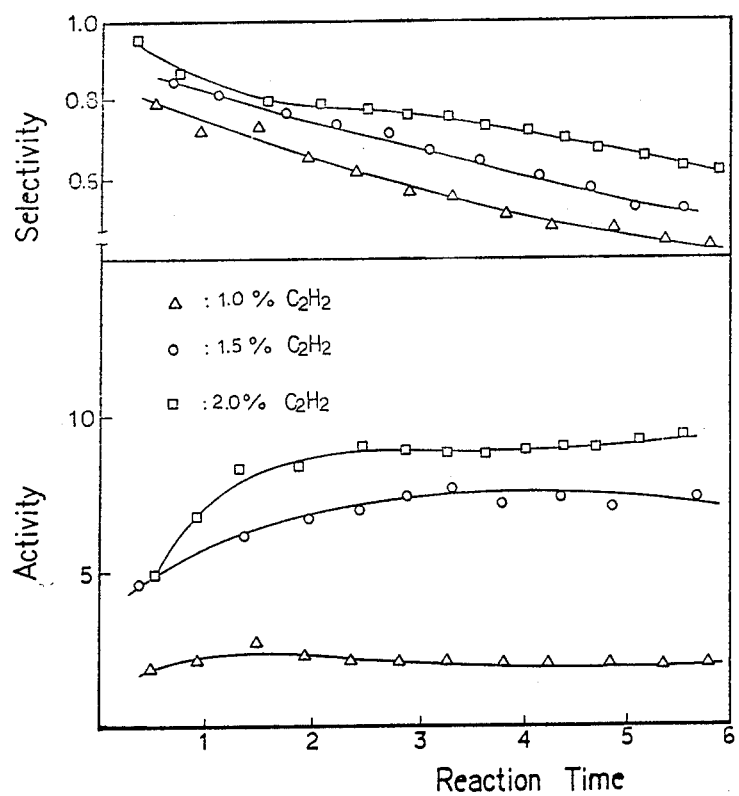

The activity and selectivity of the titania supported catalyst of the invention depending on a change in the concentration of the acetylene contained in the reactive substance were measured at the reaction temperature of 50° C. with the composition ratio of the hydrogen and acetylene taken as 2, and the results are as shown in FIG. 2.

COMPARATIVE EXAMPLE 4

The results of an experiment similar to that as described in Example 4, which was conducted with the alumina supported catalyst, showed the activity and selectivity as shown in FIG. 2. Compared these with those of Example 2, it will be seen that the catalyst of the invention has very high and stable selectivity.

EXAMPLE 5

Figure 3:
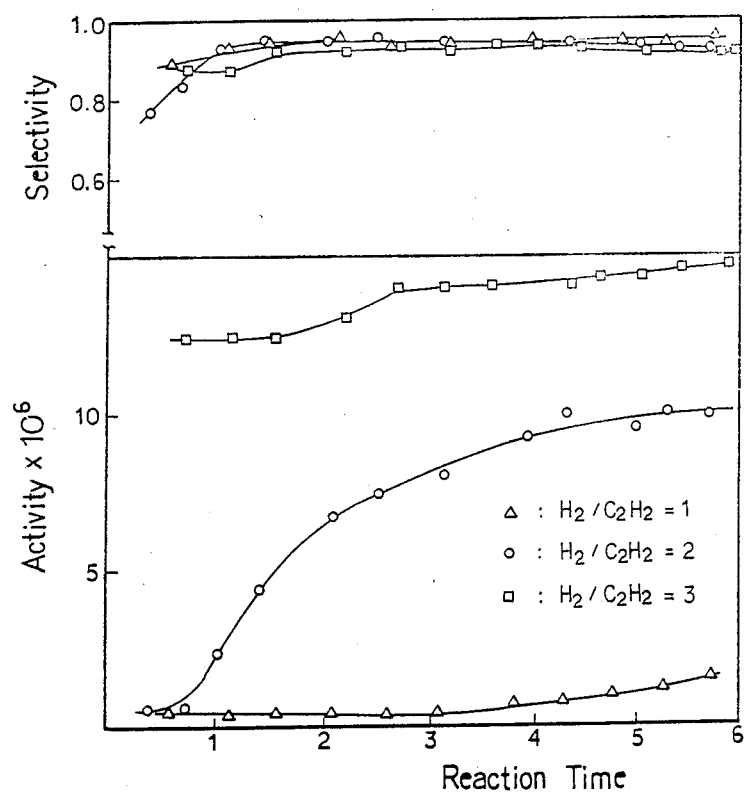
FIG. 3 is a graphic diagram showing the activity and selectivity depending on a change in the composition ratio of the hydrogen and acetylene on Titania supported palladium catalyst.
Figures 1, 3:
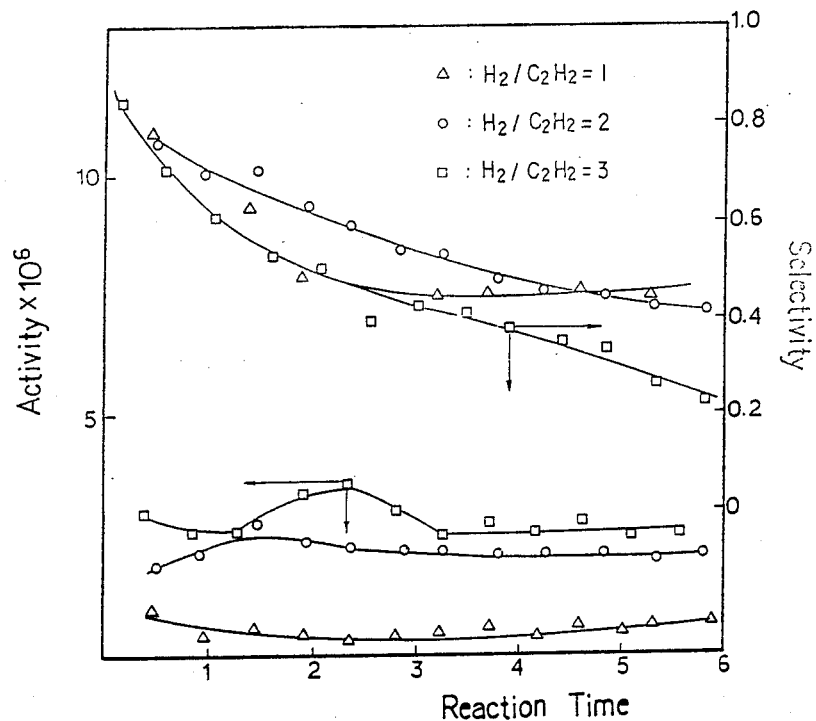

The activity and selectivity of the titania supported catalyst of the invention depending on a change in the composition ratio between the hydrogen and acetylene contained in the reactive substance were measured under the condition that the reaction temperature is 50° C., and the mole fraction of acetylene is 1%, and the results were as shown in FIG. 3.

COMPARATIVE EXAMPLE 5

As a result of an experiment similar to that as described in Example 5, which was conducted with the alumina supported catalyst, the activity and selectivity as shown in FIG. 3-1 were obtained. Compared the results with those of Example 5, it will be seen that the catalyst of the invention has very high selectivity and is stabilized.

COMPARATIVE EXAMPLE 6

Figure 4:
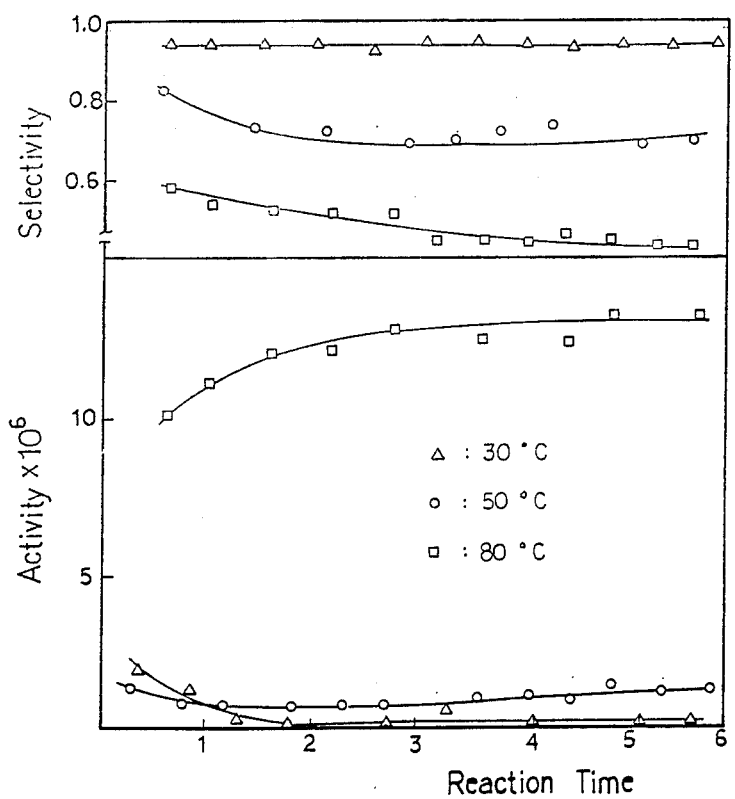
FIG. 4 is a graphic diagram showing the activity and selectivity depending on a change in the reaction temperature at the time of CO addition in 20 ppm on Alumina supported palladium catalyst.

In practical process, small quantity of the carbon monoxide is added to the reactive substance in order to enhance the selectivity of the alumina supported palladium catalyst. An experiment was conducted with the alumina supported catayst after injecting 20 ppm of carbon monoxide in the experiment of Comparative Example 3, and the activity and selectivity as shown in FIG. 4 were obtained as a result of it. Compared it with that of FIG. 1-1, it will be seen that the selectivity was improved by the injection of carbon monoxide, but it is low in comparison with the selectivity of the catalyst according to the invention. Therefore, it is apparent that it is possible for the catalyst of the invention to obtain high and stable selectivity without injecting therein the third substance, carbon monoxide.

EXAMPLE 7

The rate at which a high molecular compound being a principal cause of catalyst inactivation is accumulated on the catalyst of the invention with which experiments of Examples 3, 4 and 5 were conducted, was measured, and the results are shown in the following Table 3. The accumulation rate of high molecular compound is defined as percentage of weight increased in comparison with the catalyst prior to beginning of reaction per unit time.

TABLE 3

High molecular compound accumulation rate in the catalyst according to the invention

| Examples | Experimental parameters | Accumulation rate of high molecular compound |
|---|---|---|
| | Reaction temperature (°C.) | |
| 1 | 30 | 4.63 |
| | 50 | 1.45 |
| | 70 | 0.57 |
| | Acetylene concentration (Mole %) | |
| 2 | 0.5 | 3.17 |
| | 1.0 | 1.45 |
| | 2.0 | 0.96 |
| | Composition rate of hydrogen and acetylene ($H_2/C_2H_2$) | |
| 3 | 1 | 12.58 |
| | 2 | 1.45 |
| | 3 | 0.82 |

COMPARATIVE EXAMPLE 7

The rate at which the high molecular compound is accumulated on the alumina supported catalyst with which experiments of Comparative Examples 3, 4, 5 and 6 are conducted, is as shown in Table 3-1. It will be seen on the table that the rate is very high compared with the accumulation rate of high molecular compound (Table 3) on the catalyst of the invention, and it represents that the catalyst of the invention has a high resistance to the production of a high molecular compound.

TABLE 3-1

High molecular compound accumulation rate on Alumina supported palladium catalyst

| Comparative Examples | Experimental Parameters | Accumulation rate of high molecular compound |
|---|---|---|
| | Reaction temperature (°C.) | |
| 1 | 30 | 31.7 |
| | 50 | 8.85 |
| | 80 | 1.44 |
| | Acetylene concentration (Mole %) | |
| 2 | 1.0 | 8.85 |
| | 1.5 | 5.31 |
| | 2.0 | 7.22 |
| | Composition rate of hydrogen and acetylene ($H_2/C_2H_2$) | |
| 3 | 1 | 29.0 |
| | 2 | 8.85 |
| | 3 | 8.32 |
| | Reaction temperature (°C.) | |
| 4 | 30 | 21.8 |
| | 50 | 11.9 |
| | 80 | 2.44 |

Comparing and examining Examples 3-7 and Comparative Examples 3-7 as described above, it was turned out that the selectivity and the resistance to production of high molecular compound of the catalyst according to the invention is very high compared with the selectivity and resistance of the known Alumina supported catalyst, regardless of changes in reaction conditions. Considering that the selectivity exceeding 80% is a value unexpectable in other catalysts, it is expected that the value of the catalyst according to the invention will be very high.

We claim:

1. A process for manufacturing a titanium oxide supported palladium catalyst to convert acetylene to ethylene consisting essentially of:
   (a) removing moisture in an amount of titanium oxide in a vacuum at a temperature of 450° C. for 12 hours to produce dried titanium oxide,
   (b) dissolving an amount of palladium chloride in hydrochloric acid to produce a palladium solution and mixing sodium acetate with said palladium solution to produce an initial mixture,
   (c) diluting said initial mixture with distilled water,
   (d) pouring said diluted mixture into said dried titanium oxide to produce a second mixture,
   (e) mixing said second mixture at a pressure of 10 torr and a temperature of 80° C. to produce a third mixture, and
   (f) calcining said third mixture at a temperature of 500° C. for 3 hours and cooling to produce the catalyst composed of palladium in an amount of 0.01% to 0.2% by weight and titanium oxide carrier in an amount of 99.99% to 99.8% by weight, wherein said catalyst is selective in converting acetylene to ethylene but prevents the conversion of ethylene to ethane.

2. The process of claim 1, wherein the titanium oxide of the step (a) is poured into a flask of a rotary vacuum evaporator.

3. The process of claim 1, wherein the cooling of the step (f) is conducted at room temperature.

* * * * *